United States Patent [19]

Hirano et al.

[11] Patent Number: 4,544,872
[45] Date of Patent: Oct. 1, 1985

[54] TRACKING SERVO CONTROL SYSTEM FOR AN INFORMATION READ-OUT SYSTEM

[75] Inventors: Hiroyuki Hirano; Keiichi Matsumoto, both of Tokorozawa, Japan

[73] Assignee: Pioneer Electronic Corporation, Tokyo, Japan

[21] Appl. No.: 596,845

[22] Filed: Apr. 4, 1984

[30] Foreign Application Priority Data

Apr. 5, 1983 [JP] Japan .................................. 58-59824

[51] Int. Cl.$^4$ .......................................... G05D 23/275
[52] U.S. Cl. ...................................... 318/632; 360/77
[58] Field of Search ................... 318/608, 632; 360/77, 360/78

[56] References Cited

U.S. PATENT DOCUMENTS

| | | | |
|---|---|---|---|
| 4,168,457 | 9/1979 | Rose | 318/632 |
| 4,263,627 | 4/1981 | Rose et al. | 318/632 |
| 4,270,073 | 5/1981 | Harman | 318/632 |
| 4,338,682 | 7/1982 | Hosaka | 360/77 X |
| 4,340,950 | 7/1982 | Kosaka | 360/77 X |
| 4,344,165 | 8/1982 | Akiyama | 360/77 X |
| 4,484,235 | 11/1984 | Yokobori et al. | 360/77 X |

Primary Examiner—B. Dobeck
Attorney, Agent, or Firm—Fleit, Jacobson, Cohn & Price

[57] ABSTRACT

Tracking servo control system for an information read-out system such as a video disc player system or a compact disc player system, comprises a servo loop switch for opening and closing the tracking servo loop, and a timing control circuit for generating a timing signal for controlling the servo loop switch in accordance with an on-track signal generated from a pickup output signal and zero cross timings of the tracking error signal. In order to control the operation of the servo loop switch, very accurately, a phase shift circuit is provided between a tracking signal generating means and a zero cross detection means, which has substantially the same phase characteristics as that of an equalizer circuit utilized in the tracking servo loop.

2 Claims, 29 Drawing Figures

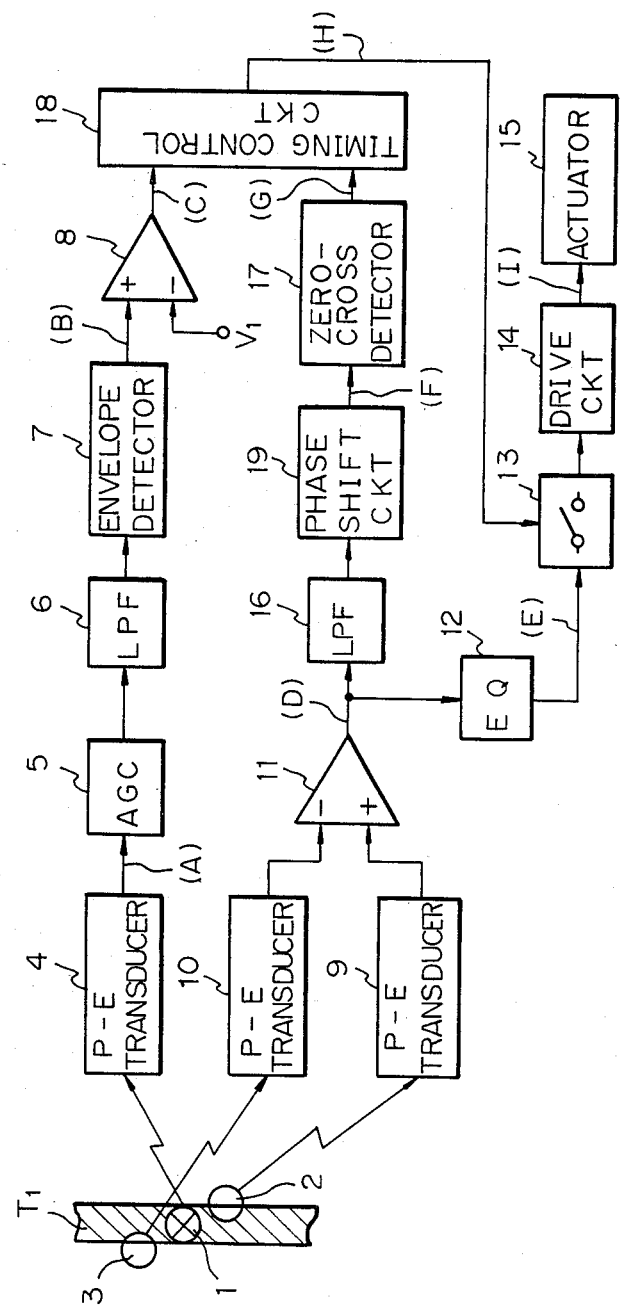

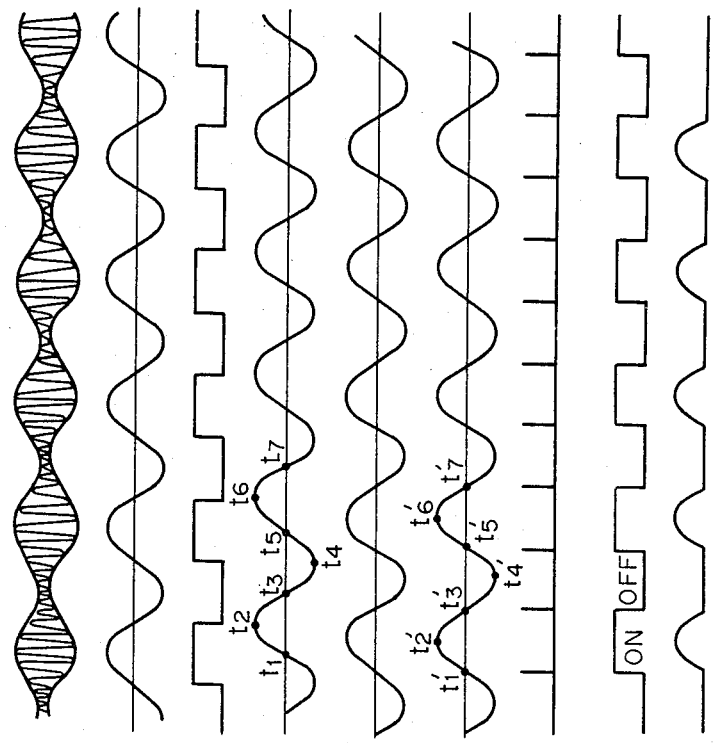

TRACKING SERVO CONTROL SYSTEM FOR AN INFORMATION READ-OUT SYSTEM

BACKGROUND OF THE INVENTION

1. Field of the Invention

The present invention relates to a tracking servo control system for an information read-out system, and more specifically to a system capable of a quick and certain lock-in of the tracking servo operation.

2. Description of Background Information

In a system for reading-out recorded information, such as a video disc player system and PCM disc or compact disc player system, an information detection point, i.e., a point at which reading-out of the information is taking place, is likely to deviate from the recording track, in a radial direction of the recording disc. This is due to the presence of an eccentricity, that is, the discrepancy between the center of the disc rotation at the time of recording and the center of the disc rotation during playback operation. This eccentricity can also be caused by a precession, that is, the motion of the center of the disc, while the disc is rotating in the information read-out system.

The tracking servo system is utilized in the information read-out system in order to apparently cancel this discrepancy and to make the detection point to trace the center of the recording track correctly.

The tracking servo system generally includes means for generating a tracking error signal having a level and a polality representing the magnitude and the direction of the displacement of the information detection point from the center of the recording track. Then, the information detection point is forcedly moved in the radial direction of the disc in accordance with this tracking servo signal.

Further, in order to realize a stable operation of the system, the tracking servo system is provided with an open loop operation which is utilized during an initiation period of the tracking servo operation. However, a problem of the conventional tracking servo systems is that there is a difference in the phase of the tracking error signal and the phase of a control signal for commanding the switch over between the open loop operation and the closed loop operation of the tracking servo system. Another problem of the conventional tracking servo systems is that the speed of the lead-in operation of those systems is relatively slow.

SUMMARY OF THE INVENTION

An object of the present invention is therefore to alleviate the problem of the prior art tracking servo systems and to provide a tracking servo system which is capable of a very stable and quick lead-in of the servo operation.

According to the present invention, a tracking servo control system including a zero cross detection means for detecting a zero cross timing of a tracking error signal and a timing control means for controlling on/off timing of a servo loop switch in accordance with a zero cross detection signal produced by the zero cross detection means and an on-track signal generated from a pickup output signal, is provided with a phase shift means which has a phase shift characteristics substantially the same as the phase shift characteriscs of an equalizer circuit used in the tracking servo loop, and the tracking error signal is applied to the zero cross detector through the phase shift circut so as to provide a very accurate operation of the servo loop switch.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects and advantages of the invention will become more clearly understood from the following description taken in conjunction with the accompanying drawings which are given by way of illustration only, and thus are not limitative of the present invention, and wherein:

FIG. 7 is a block diagram of an embodiment of the tracking servo control system of the present invention;

FIGS. 9A through 9I are waveform diagrams showing the waveforms of the signals (A) to (I) generated at various points of the circuit of FIG. 7.

DETAILED DESCRIPTION OF PREFERRED EMBODIMENTS

Figure 1A:
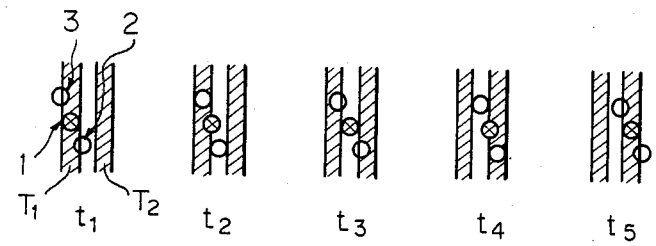
FIG. 1A shows schematic diagrams depicting the relationship between the position of the read-out light spot and the recording tracks in a sequence.
Figure 1B:
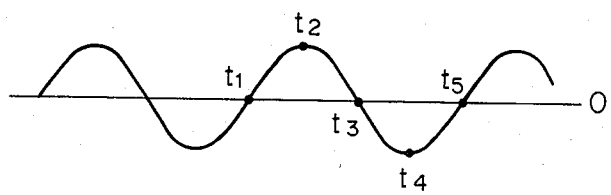
FIG. 1B is a waveform diagram of a tracking error signal obtained in the states of FIG. 1B.

Before entering into the explanation of an embodiment of the focus servo device according to the present invention, reference is first made to FIGS. 1A and 1B in which the relation beween the magnitude of the deviation of the information detection point from the center of the recording track, and the waveform of the tracking error signal is exemplary illustrated.

FIG. 1A shows, in a sequential manner, a position of the information detection point which is moving perpendicularly with respect to the recording tracks. As shown, a read-out light consists of an information read-out light spot (hereafter, read-out light spot) 1 and two tracking light spots 2 and 3 on both sides of the read-out light sport 1. Further, an arrangement and relative distances among the light spots 1 through 3 are so determined that a part of the tracking light spots 2 and 3 are on the recording track $T_1$ and the area of those parts are equal with each other when the center of the read-out light spot 1, i.e., the information detection point, is at the center of a recording track $T_1$, as illustrated in the left end of FIG. 1A, showing a state at a time $t_1$. In the rest portions towards the right end of the FIG. 1A, there are illustrated following sequential states respectively at times $t_2$ through $t_5$, through which the read-out light spot 1 is translated to the next one $T_2$ of the recording tracks.

A waveform of the tracking signal obtained when the read-out light spot 1 travels across the recording tracks is illustrated in FIG 1B, in which points $t_1$ through $t_5$ represent the magnitude of the tracking error signal respectively at each of states of times $t_1$ through $t_5$ of FIG. 1A. As shown, the tracking signal is in the form of a sinusoidal wave and whose magnitude and polarity are representative of the distance (or error) of the position of the read-out light beam from the recording track and the direction thereof.

During a starting period of the information read-out system or when some disturbance is applied to the information read-out system, the tracking servo loop is generally opened so as to prevent an excessive movement of the read-out light spot due to the generation of a tracking error signal of relatively large magnitude. Therefore, in order to start a proper operation of the tracking servo system, it is necessary to produce a signal for commanding the closing of the tracking servo loop. Then, it will be appreciated that such a wave form of the tracking error signal as shown in FIG 1B is obtained when the tracking servo loop is opened, due to the relative movement of the recording tracks, caused by the above mentioned eccentricity and precession.

The movement of the read-out light beam during a transient period from the open loop operation to the closed loop operation of the tracking servo system will be explained hereinafter with reference to FIG. 1B more specifically.

Assume that the tracking servo loop is closed at the time $t_1$, and the relative velocity of the recording track and the read-out light spot at this time $t_1$ is $v_0$(m/sec), acceleration of the read-out light spot moved by means of a tracking actuator is g(m/sec$^2$) and, for the purpose of simplification, that the tracking actuator can immediately respond to the presence of a tracking error and move the information read-out light spot at an acceleration value of g(m/sec$^2$).

Accordingly, the position x of the read-out light spot t seconds after the closing of the tracking servo loop is:

$$x = \tfrac{1}{2}gt^2 + v_0 t \quad (1)$$

The relative velocity of the read-out light spot with respect to the recording track is as follows:

$$v = v_0 - gt \quad (2)$$

If the relative velocity v becomes equal to zero when the read-out light spot has reached the position of time $t_3$, in other words, while the read-out light spot is travelling half a track pitch, 0.8 m$\mu$ for example, the read-out light spot will be locked-in at the initial position corresponding to the time $t_1$. In the normal operation of the tracking servo system, the above operation takes place and the read-out light spot is normally locked-in.

However, if the initial value of the relative velocity $v_0$ of the read-out light spot is excessively large or if the acceleration of the actuator is small, the relative velocity of the read-out light spot does not become equal to zero at the position corresponding to the time $t_3$.

Figure 2A:
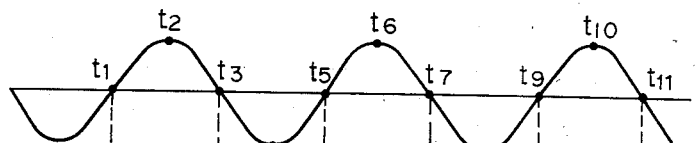
FIGS. 2A and 2B are diagrams showing the relationship between the waveform of the tracking error signal and the potential energy of the information read-out point.

This state of the movement of the read-out light spot will be explained more specifically with reference to FIGS. 2A and 2B. FIG. 2A shows the waveform of a tracking error signal in which positions designated by $t_1$ through $t_5$ corresponds to the positions $t_1$ through $t_5$ of FIG. 1A. Also in this case, the actuator is immediately driven to move the read-out light spot upon presence of even the minimum level of the tracking error, and the information read-out point is accelerated at an acceleration value g in the direction determined by the polarity of the tracking error signal.

Figure 2B:
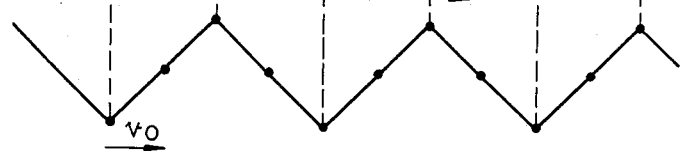

Therefore, when the tracking servo loop is closed, the potential energy of the information read-out point varies in a manner as shown in FIG. 2B. In this state, if the servo loop is closed at the time $t_1$, the information read-out point moves to the position of time $t_3$ while transforming its kinetic energy into the potential energy. If, in this state, the relative velocity between the information read-out point and the recording track does not become equal to zero and has a value $v_1$, then the information read-out point is accelerated to increase the relative velocity v while losing the potential energy, and moves through the positions corresponding to times $t_3$ through $t_5$. Further, through positions corresponding to times $t_5$ through $t_7$, the velocity v reduces as the decrease of the kinetic energy. Therefore, if a resisting force such as frictional resistance is neglected, the information read-out point has, at a time $t_7$, the same velocity $v_1$ and the same direction as that of the time $t_3$.

In other words, the information read-out point travels across a plurality of recording tracks and it is not possible to lock-in the information read-out point at a desired one of recording tracks. More specifically, while the information read-out point travels through a plurality of recording tracks, the tracking error signal takes the form of an alternating current signal with a period corresponding to the interval of the recording tracks. With this tracking error signal in the form of the alternating current signal, the tracking servo system controls the tracking actuator, and the operation of the tracking servo system becomes stable for the half period of the tracking error signal, for example during the time $t_1$ through $t_3$. For the other half period of the tracking error signal, for example during the time $t_3$ through $t_5$, the tracking servo system becomes unstable. The term "stable" and "unstable" used above respectively means the decrease and the increase of the kinetic engergy of the tracking servo system while the information read-out point travels across the recording tracks.

Accordingly, in the case of this type of tracking servo systems, the lock-in of the servo system has to be completed during the stable half period of the tracking error signal. This requirement, together with the above mentioned impossiblity of the lock-in of the servo system, has resulted in a difficulty that an easy and effective lock-in of the tracking servo system is very difficult.

Due to the above reasons, the present applicant has developed an improved tracking servo system in which a stable lock-in of the servo system is assured.

Figure 3:
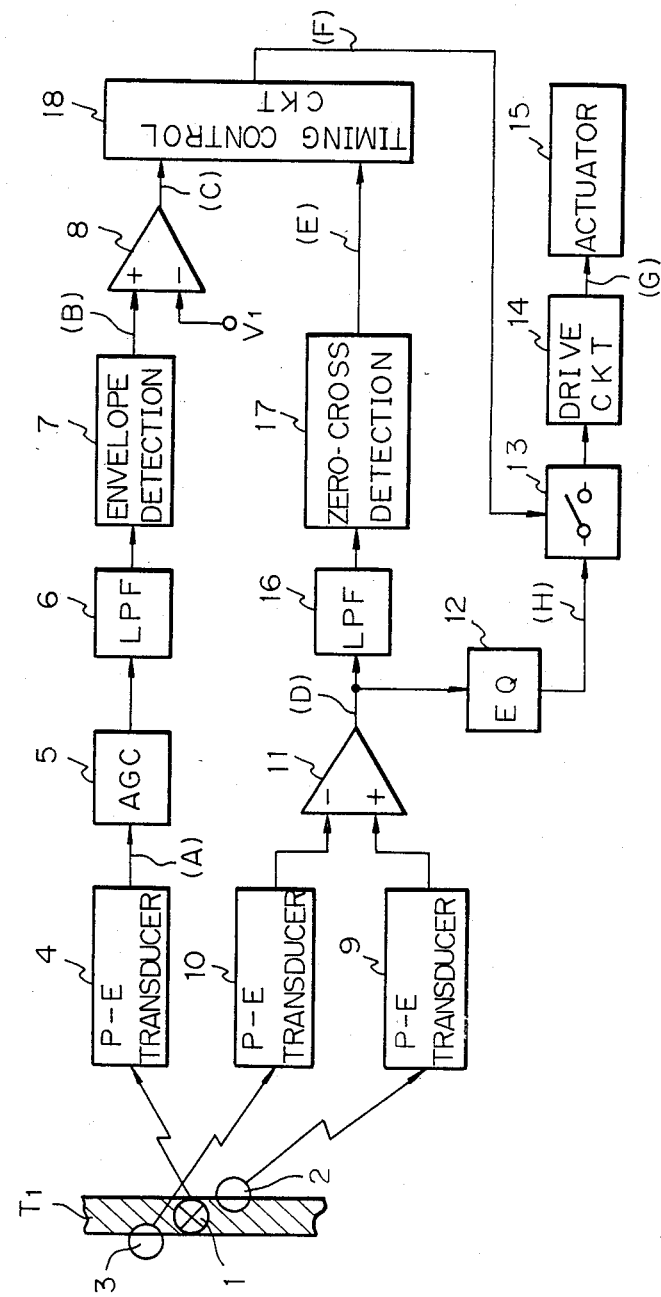
FIG. 3 is an example of a conventional circuit construction of the tracking servo control system.

In FIG. 3, the schematic diagram of the tracking servo system proposed by the applicant is illustrated.

As shown, a read-out light spot 1 and a pair of tracking light spots are focused on a recording track $T_1$. A reflection light beam of the read-out light spot 1 is directed to a photo-electric transducer 4 in which the photo energy is transformed into an electric signal (A). An output signal of the photo-electric transducer 4 is applied to an AGC (Automatic Gain Control) amplifier 5. An output signal of the AGC amplifier 5 is in turn applied to an LPF (Low Pass Filter) 6 in which signals in an audio FM signal band having relatively low frequency carrier frequency and the frequency characteristics thereof is not affected by the linear velocity of the recording track, are transmitted. An output signal of the LPF 6 is then applied to an envelope detector 7 in which the output signal of the LPF 6 is detected and provided as an envelope signal (B), and the envelope signal from the envelope detector 7 is compared with a reference level $V_1$ in a level comparator 8. A comparator output signal (C) of the level comparator 8 has a high level when the level of the envelope signal is higher than the level of the reference signal, and a low level when the level of the envelope signal is lower than the level of the reference signal. This comparator output signal (C) forms an on-track signal indicative of the position of the read-out light spot on the recording track.

On the other hand, reflection light beams of the tracking light spots 2 and 3 are directed to corresponding photo-electric transducers 9 and 10 whose output signals are applied to a differential amplifier 11 which produces a tracking error signal (D). The tracking error signal (D) is then directed to a drive amplifier 14 via an equalizer amplifier 12 for the compensation of frequency characteristics and a servo loop switch 13. By an output signal of the drive amplifier 14, an actuator 15 is driven to move the position of the read-out light spot.

Further, the tracking error signal (D) is also directed, via an LPF (Low Pass Filter) 16 at which a noise component is rejected, to a zero-cross detector 17. In the zero-cross detector 17, the zero-cross timing of the tracking error signal (D) is detected and a detection signal (E) is generated at each of the detected zero-cross timing. The timing of generation of these detection signal is synchronized to times at which the information read-out signal is travelling through the center of a recording track and times at which the information read-out signal is travelling through a middle point of two adjacent recording tracks, as shown in FIG. 1. The thus produced detection signals form first and second timing signals.

These two timing signals (E) and the on-track signal (C) produced by the level comparator 8 is applied to a timing control circuit 18 which produces an on/off control signal (F) of a servo loop switch 13, and consists of a D-flip flop, for example.

Figure 4A:
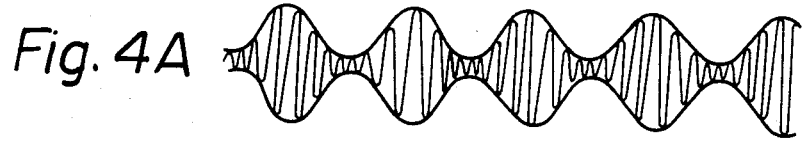
FIGS. 4A through 4G are waveform diagrams of signals (A) through (G) obtained at various points of the circuit of FIG. 3.
Figure 4B:
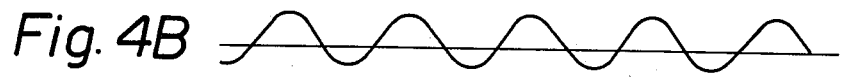
Figure 4C:
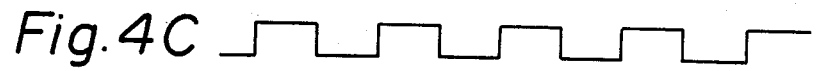
Figure 4D:
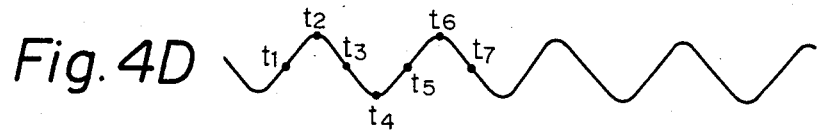
Figure 4E:
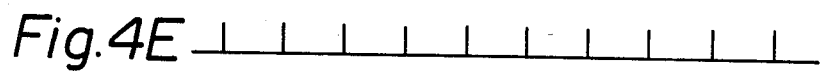
Figure 4F:

FIGS. 4A through 4G are diagrams which respectively show waveforms of the signals (A) through (G) of the tracking servo system of FIG. 3. Assume that the zero cross signal detection signal (E) is produced from the zero cross detector 17 at the time $t_1$, as shown in FIG. 4E. In this stage, the on-track signal (C) is at high level, i.e., the read-out light spot is crossing the center of a recording track. By this timing signal (E), the timing control circuit 18 produces a high level control signal (F) for turning the servo loop switch on. Consequently, the tracking servo system starts its control operation.

With the operation of the tracking servo loop, the actuator is controlled in a direction for decreasing the relative speed while the read-out light spot is travelling across the recording track through the times $t_1$, $t_2$, and $t_3$.

When the read-out light spot is travelling through the position corresponding to the time $t_3$, the on-track signal (C) is at low level. Therefore, the read-out light spot is travelling through a substantially central position between two recording tracks. Therefore, at this point of time $t_3$, the timing control circuit 18 produces a low level control signal (F) in accordance with the timing signal (E). The servo loop switch 13 is turned off by this low level control signal and the actuator 15 is controlled to move the read-out light spot at substantially constant speed.

Further, while the time passes through the time point $t_5$, $t_6$, and $t_7$, the servo loop switch is turned on to accelerate the read-out light spot in a direction to reduce the relative velocity.

Figure 4G:

As will be understood from the above, the servo loop is opened during the unstable period of the tracking servo loop, in other words, when the relative velocity between the read-out light spot and the recording track is increasing. On the other hand, the tracking servo loop is closed only during the stable period of the tracking servo loop, i.e., when the relative velocity is decreasing. The waveform of the control signal (G) applied to the actuator 15 takes the form as shown in FIG. 4G, and therefore, only a braking force is applied to the actuator 15, and the relative speed of the read-out light spot crossing the recording track decreases to assure a positve lock-in of the tracking servo loop. However, since the tracking servo system of FIG. 3 includes the equalizer circuit 12 for treating the tracking error signal, phase shift of the tracking error signal is inevitably generated.

Therefore, the tracking servo system of FIG. 3, necessarily has a drawback which wil be described in detail hereinafter with reference to FIGS. 5A through 6C.

Figure 5A:
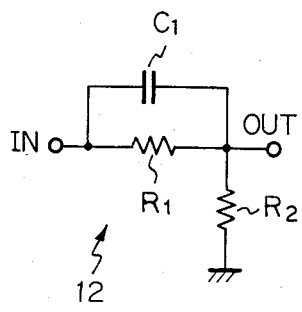
FIG. 5A is a circuit diagram of the equalizer circuit 12 used in the circuit of FIG. 3.
Figure 5B:
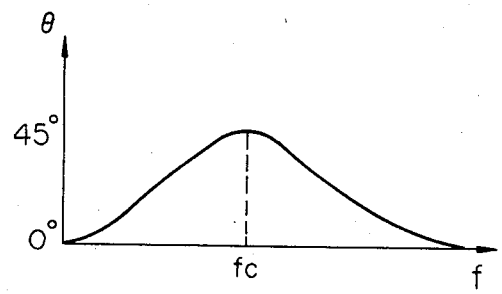
FIG. 5B is a diagram showing the phase shift characteristics of the equalizer circuit of FIG. 5A.
Figure 6A:
FIGS. 6A through 6C are waveform diagrams showing the waveforms of the signals (F), (G), (H) of the circuit of FIG. 3, taking the acount of the phase shift characteristics of the equalizer circuit 12.
Figure 6B:
Figure 6C:

FIG. 5A is a circuit diagram of the equalizer 12, which is made up of a resistor $R_1$, $R_2$, and a capacitor $C_1$. According to the phase transition characteristics of the equalizer circuit 12 illustrated in FIG. 5B, the maximum phase shift (around 45° in this particular case) occurs at a frequency $f_c$. In general circuits, the phase shift amount reaches the value of 40° trough 70°, for the frequency of several hundreds through several thousands Hertz. While passing through this equlizer circuit 12, the phase of the tracking error sigal is advanced. Therefore, an error develops in the phase relation between an equlizer output signal (H) and the control signal (F) for opening and closing the tracking servo loop as shown in FIG. 6A and 6B. Accordingly, the control signal to be applied to the actuator 15 has such a waveform as illustrated in FIG. 6C. This means that the phase of the tracking error signal (H) past the equalizer 12 and the phase of the loop open signal (F) are not equal and the actuator is applied with an acceleration force as well as the braking force, which has an adverse affects on the quick and stable lock-in of the servo operation.

Turning to FIG. 7, an embodiment of the tracking servo system of the present invention will be explained hereinafter.

As shown, read-out light spot 1 and a pair of tracking light spots are focused on a recording track $T_1$. A reflection light beam of the read-out light spot 1 is directed to a photo-electric transducer 4 in which the photo energy is transduced to an electric signal (A). An output signal of the photo-electric transducer 4 is applied to an AGC (Automatic Gain Control) amplifier 5. An output signal of the AGC amplifier 5 is applied to an LPF (Low Pass Filter) 6 in which signals in an audio FM signal band having relatively low frequency carrier frequency and the frequency characteristics thereof is not affected by the linear velocity of the recording track, are transmitted. An output signal of the LPF 6 is then applied to an envelope detector 7 in which the output signal of the LPF is detected and provided as an envelope signal (B), and the envelope signal from the envelope detector 7 is compared with a reference level $V_1$ in a level comparator 8. A comparator output signal (C) of the level comparator 8 has a high level when the level of the envelope signal is higher than the level of the reference signal, and a low level when the level of the envelope signal is lower than the level of the reference signal. This comparator output signal (C) forms an on-track signal indicative of the position of the read-out light spot on the recording track.

On the other hand, reflection light beams of the tracking light spots 2 and 3 are directed to corresponding photo-electric transducers 9 and 10 whose output signals are applied to a differential amplifier 11 which produces a tracking error signal (D). The tracking error signal (D) is then directed to a drive amplifier 14 via an equalizer amplifier 12 for the compensation of frequency characteristics and a servo loop switch 13. By an output signal of the drive amplifier 14, an actuator 15 is driven to move the position of the read-out light spot.

Further, the tracking error signal (D) is also directed, via an LPF (Low Pass Filter) 16 at which a noise component is rejected, to a zero-cross detector 17 via a phase shift circuit 19. In the zero-cross detector 17, the zero-cross timing of the tracking error signal (D) is detected and a detection signal (E) is generated at each of the detected zero-cross timings.

These two timing signals (E) and the on-track signal (C) produced by the level comparator 8 is applied to the timing control circuit 18 which produces an on/off control signal (F) of a servo loop switch 13, and consists of a D-flip flop, for example.

Further, this embodiment features that a phase shift circuit 19 is provided to receive the output signal of the LPF 16, and the tracking error signal (D) is applied to the zerocross detector 17 after passing through the LPF 16 and the phase shift circuit 19.

Figure 8A:
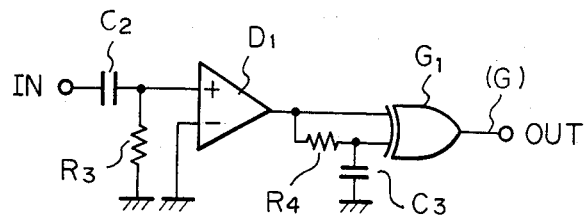
FIG. 8A is a circuit diagram of an example of the phase shift circuit 19 of FIG. 7.

FIG. 8A shows an example of circuit construction of the phase shift circuit 19 and the zero cross detector 17. As shown, the output signal of the LPF 16 is applied to a zero cross comparator $D_1$, via a high pass filter (HPF) circuit made up of a coupling capacitor $C_2$ and a resistance $R_3$. Further, a resistor $R_4$, a capacitor $C_3$, and an EXCLUSIVE-OR gate $G_1$ are provided to receive an output signal of the zero cross comparator $D_1$. By these circuit elements, leading edges and trailing edges of the output signal of the zero-cross comparator $D_1$, are detected and outputted as a zero-cross edge pulse signal (G).

Figure 8B:
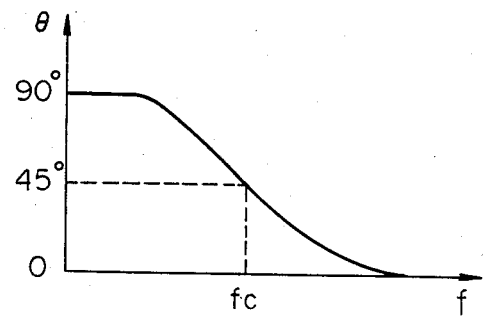
FIG. 8B is a diagram showing the phase shift characteristics of the phase shift circuit of FIG. 8A.

FIG. 8B shows a phase shift characteristics of the HPF circuit, in which the phase advance is almost 45° at a cut off frequency fc. Therefore, by selecting this cut off frequency at the value at which the maximum phase shift (45°) of the equalizer occurs, the phase shift value of the output signal of the phase shift circuit 19 becomes substantially equal to that of the output signal of the equalizer 12.

FIGS. 9A through 9I illustrate waveforms of the signals (A) to (I) of the tracking servo system of FIG. 7.

As shown in FIG. 9F, the phase of the output signal (F) of the phase shift circut 19 is equal to the phase of the ouput signal (E) of the equalizer circuit 12 shown in FIG. 9E. Therefore, an accurate operation of the tracking servo system is enabled.

More specifically, during a time period from a time $t'_1$ through a time $t'_3$ of FIG. 9F, the actuator is applied with a brake force and the tracking servo loop is closed during this time period. At the time $t'_3$, the on-track signal has a low level, and the timing control circuit 18 produces a low level control signal (H) for opening the tracking servo loop, in accordance with the zero-cross timing signal (G).

Therefore, during a time period from the time $t'_3$ to a time $t'_5$, the actuator is operated to move the read-out light spot at substantially constant speed.

After that, during a time period from the time $t'_5$ to a time $t'_7$, the tracking servo loop is closed once more and the braking force is applied to the actuator to reduce the relative velocity. In addition, the waveform of the drive signal applied to the actuator 15 is as shown in FIG. 9I, and only the braking force is applied in this period.

In view of the foregoing, it will be appreciated that the quick and positive lock-in of the tracking servo system is enabled by the provision of the phase shift circuit 19.

Further, by employing the circuit construction of FIG. 8A, the circuit construction of the system can be simplified and it becomes unnecessary to use a phase shift circuit of higher price and having rather complicated circuit construction.

Further, in the case of the curcuit construction of FIG. 8A, the phase shift amount becomes greater for the lower frequency range as shown in FIG. 8B. However, it is very unlikely that the information read-out point crosses the recording track under a condition of such a low frequency of the tracking error signal, since the lock-in of the tracking servo system has been completed before the tracking error signal frequency is reduced to that level. However, it is needless to say that an independent phase shift circuit can be used instead of the circuit of FIG. 8A.

It will be appreciated from the foregoing, that according to the present invention, the tracking error signal is shifted in phase for the zero-cross detection. Therfore, the phase of the output signal of the equalizer of the tracking servo loop and the phase of the on/off timing of the servo loop can be synchronized. As the result, only the braking force is applied to the actuator to quicken and stabilize the lock-in of the tracking servo system.

A preferred embodiment of the present invention has been described above. It should be understood, however, that the foregoing description has been for the purpose of illustration only, and is not intended to limit the scope of the present invention. Rather, there are numerous equivalents to the preferred embodiment.

What is claimed is:

1. A tracking servo control system for an information read-out system in which a recorded information is read-out from a recording medium having a plurality of recording tracks and an information read-out point can be displaced with respect to position of the recording track by means of a tracking actuator, comprises:
   a tracking error signal generating means for generating a tracking error signal representing a magnitude and a direction of a tracking error;

a phase compensation means responsive to said tracking error signal, for controlling a phase characteristics of said tracking error signal;

a drive means for driving the tracking actuator in accordance with said tracking error signal from said phase compensation means;

a servo loop switch means disposed between said phase compensation means and drive means for enabling and disabling the transmission of the tracking error signal to the drive means in accordance with a timing control signal;

an on-track signal generating means, for generating an on-track signal when the information read-out point is located on one of recording tracks;

a zero cross detection means responsive to said tracking error signal, for generating a zero cross detection signal indicative of zero cross timings of said tracking error signal;

a timing control means for generating said timing control signal for opening and closing said servo loop switch means, in accordance with said on-track signal and said zero cross detection signal; and a phase shift means disposed between said tracking error signal generating means and said zero-cross detection means, having a phase shift function substantially the same as that of said phase compensation means for a predererminted frequency range of said tracking error signal, whereby correcting a timing of on/off operation of the servo loop switch means and assuring a quick and stable lock-in of the tracking servo loop.

2. A tracking servo control system as set forth in claim 1, wherein said phase shift means takes the form of a high pass filter circuit consists of a coupling capacitor and a grounding resistor, having a phase shift characteristics around its turnover frequency.

* * * * *